(No Model.)

A. SCHOLZ.
CIGAR STUMP RECEPTACLE.

No. 518,827. Patented Apr. 24, 1894.

WITNESSES:
Jacob Nussblatt
Geo. L. Wheelock

INVENTOR
August Scholz
BY
Joseph L. Jaeger
ATTORNEYS.

UNITED STATES PATENT OFFICE.

AUGUST SCHOLZ, OF NEW YORK, N. Y.

CIGAR-STUMP RECEPTACLE.

SPECIFICATION forming part of Letters Patent No. 518,827, dated April 24, 1894.

Application filed November 14, 1893. Serial No. 490,944. (No model.)

*To all whom it may concern:*

Be it known that I, AUGUST SCHOLZ, a citizen of the United States, residing in the city, county, and State of New York, have invented certain new and useful Improvements in Cigar-Stump Receptacles, of which the following is a specification.

This invention has reference to an improved receptacle for cigar-stumps, by which a cigar that is partly consumed can be conveniently stored away in the receptacle and carried in the pocket, when entering a car or other place in which smoking is not permitted, and can be readily lighted after leaving such place; and the invention consists of a cigar-stump receptacle formed of two hinged shells or sections provided with a locking device, for permitting the insertion of the partly smoked cigar, one of the hinged sections or shells being provided with an exterior shell, between which and the inner shell a receptacle for the storage of matches is provided, said receptacle being accessible by means of a cap hinged to the lower end of one side of the shell, and which is locked to the opposite side of the same by a suitable catch or other locking device, as will be fully described hereinafter and finally pointed out in the claims.

Figure 1:
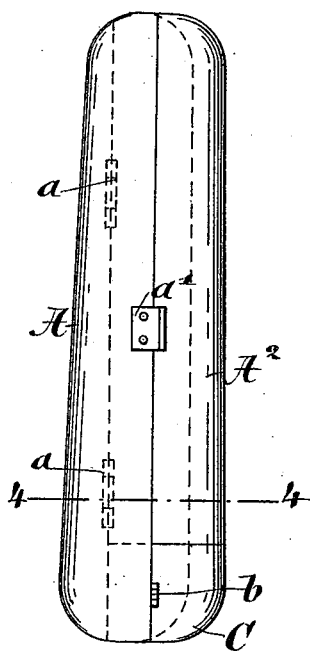
Figure 2:
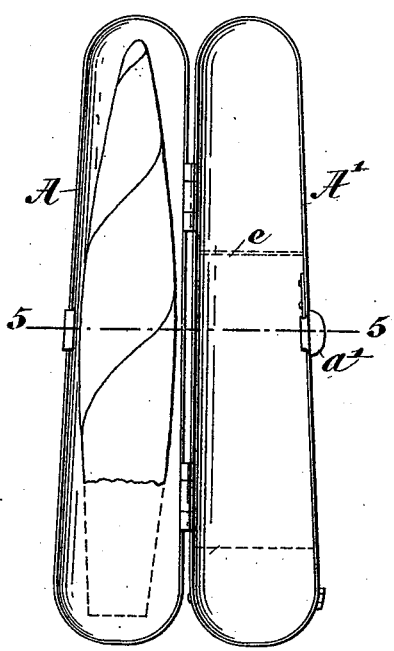
Figure 3:
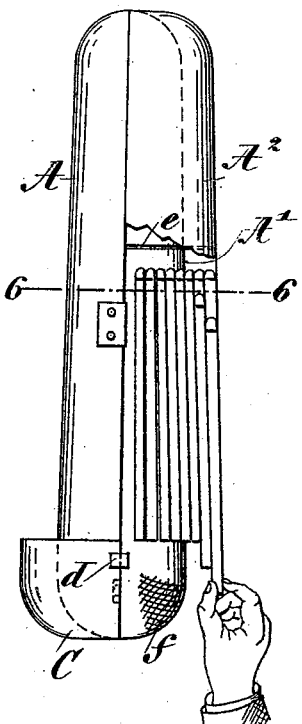
Figure 4:
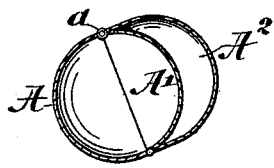
Figure 5:
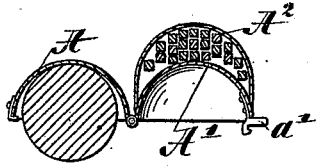
Figure 6:
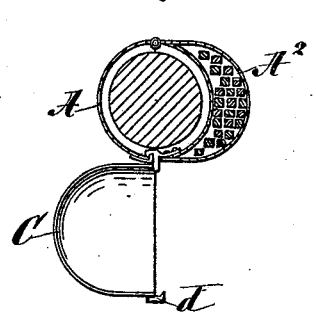

In the accompanying drawings, Figure 1 represents a side-elevation of my improved cigar-stump receptacle. Fig. 2 is an elevation showing the same in open position for inserting the partly smoked cigar. Fig. 3 is a side-elevation with a part of the exterior shell broken away, and the cap of the match receptacle shown in open position, and Figs. 4, 5 and 6 are horizontal sections respectively on lines 4—4, Fig. 1, 5—5, Fig. 2, and 6—6, Fig. 3.

Similar letters of reference indicate corresponding parts.

Referring to the drawings, A and A' represent the sheet-metal sections or shells of my improved cigar-stump receptacle, said shells being hinged at one side at $a$—$a$ and connected by a spring-catch $a'$ at the opposite side. Upon pressing the spring-catch $a'$ outwardly the shells can be readily opened on the hinges $a$, for inserting or removing the partly-smoked cigar. The shell A' is preferably made of somewhat smaller size than the shell A and is provided with an exterior shell $A^2$ which is made of greater convexity than the shell A', and permanently soldered to the latter so as to form a crescent-shaped space for the reception of matches. At the lower end of the exterior section $A^2$ is arranged a laterally swinging cap C, which is hinged at one edge to the section A', and provided at the other side with a spring-catch $d$, so that the cap is locked in position to the shell A' and retains thereby the matches in the space between the interior and exterior shells A', $A^2$. To prevent the endwise shifting of the matches in the space between the shells A', $A^2$, it is preferable to arrange in this space a transverse partition $e$.

When the receptacle is to be used for storing away the partly-smoked cigar, the catch $a'$ is released and the shells A, A', opened, so that the cigar can be placed in the shell A, the shell A' being then turned on its hinges so as to inclose the cigar, and locked by the spring-catch $a'$. When it is desired to continue smoking, the shells A, A' are opened again by releasing the spring-catch, the partly-smoked cigar is removed, the shells are closed again, the cap C is then opened by releasing its spring-catch, and a match is then removed from the space between the shells A', $A^2$. A suitable friction-surface may be arranged either at the end of the shells A, A', or on the outside of the cap, as shown at $f$ in Fig. 3, or at any suitable point on the outside of the shells or cap, so that the match removed from the match receptacle between the shells A', $A^2$, can be readily ignited for relighting the cigar. The cap is then closed again and the receptacle placed in the pocket.

I am aware that receptacles for partly-smoked cigars, composed of two hinged shells provided with a retaining catch or lock are known, and I do not claim this feature. I am not aware, however, that the arrangement of a fixed exterior shell on one of the hinged shells, so that a receptacle for matches is formed, to which access is given by means of a cap having a suitable catch for locking the same in position, has been used before.

Having thus described my invention, I claim as new and desire to secure by Letters Patent—

1. A receptacle for partly-smoked cigars, composed of two hinged shells having suitable locking means, one of the shells being provided with an exterior shell having a cap at one end, so as to give access to the space between the exterior shell and the shell to which it is attached, substantially as set forth.

2. A receptacle for partly-smoked cigars, consisting of two shells hinged together at one side and provided with a spring-catch at the opposite side, one of the shells being provided with an exterior shell so as to form a space for matches between the interior and exterior shells, the exterior shell being provided with a cap hinged to the inner shell, said cap having means for locking it in position, substantially as set forth.

In testimony that I claim the foregoing as my invention I have signed my name in presence of two subscribing witnesses.

AUGUST SCHOLZ.

Witnesses:
PAUL GOEPEL,
K. R. BRENNAN.